(12) United States Patent
Shimamura

(10) Patent No.: US 6,996,701 B2
(45) Date of Patent: Feb. 7, 2006

(54) COMPUTER SYSTEM EMPLOYING PIPELINE OPERATION

(75) Inventor: Akimitsu Shimamura, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 637 days.

(21) Appl. No.: 09/963,894

(22) Filed: Sep. 25, 2001

(65) Prior Publication Data

US 2002/0038418 A1 Mar. 28, 2002

(30) Foreign Application Priority Data

Sep. 26, 2000 (JP) .............................. 2000-292178

(51) Int. Cl.
*G06F 9/00* (2006.01)
(52) U.S. Cl. ...................... 712/221; 713/501
(58) Field of Classification Search ................ 712/23, 712/30, 221; 713/400, 501, 600, 30
See application file for complete search history.

(56) References Cited

U.S. PATENT DOCUMENTS

| | | | | |
|---|---|---|---|---|
| 3,656,123 A | * | 4/1972 | Carnevale et al. | 713/600 |
| 4,456,995 A | * | 6/1984 | Ryan | 714/723 |
| 5,253,349 A | * | 10/1993 | Kreitzer | 712/223 |
| 5,649,174 A | * | 7/1997 | Dockser | 713/501 |
| 5,828,868 A | * | 10/1998 | Sager et al. | 713/501 |
| 6,023,756 A | * | 2/2000 | Okamura | 712/208 |
| 6,161,171 A | | 12/2000 | Morikawa et al. | |
| 6,216,234 B1 | * | 4/2001 | Sager et al. | 713/501 |
| 6,256,745 B1 | * | 7/2001 | Sager et al. | 713/501 |
| 6,668,316 B1 | * | 12/2003 | Gorshtein et al. | 712/221 |

* cited by examiner

*Primary Examiner*—Eddie Chan
*Assistant Examiner*—Aimee Li
(74) *Attorney, Agent, or Firm*—Hamre, Schumann, Mueller & Larson, P.C.

(57) ABSTRACT

A computer system that can be operated by a clock frequency higher than the clock frequency by which the critical path instruction is executed correctly. The pipeline is driven at a high clock frequency higher than the clock frequency by which critical path instruction can be executed correctly. The computer system includes a high frequency ALU being operated by the pipeline clock frequency, and at least two low frequency ALUs being operated by the low clock frequency by which the critical path instruction is executed correctly. Each instruction of the execution stage is inputted to the low frequency ALUs alternately and each executes the critical path instruction in two machine cycles. If the high frequency ALU can execute an instruction correctly, the output of the high frequency ALU is selected as the execution result of the pipeline execution stage, and if the high frequency ALU cannot execute an instruction correctly, the output of a low frequency ALU which is in charge of the same instruction is replaced as the execution result of the pipeline execution stage.

26 Claims, 11 Drawing Sheets

COMPUTER SYSTEM EMPLOYING PIPELINE OPERATION

BACKGROUND OF THE INVENTION

1. Field of the Invention

The present invention relates to a computer system employing a pipeline control.

2. Description of the Related Art

FIG. 10 is a block diagram showing a conventional computer system. As shown in FIG. 10, a conventional computer system is composed of an instruction fetch block 1 (hereinafter, it is referred to as IFB), a decode block 4 (hereinafter, it is referred as DECB), and an execution block 7 (hereinafter, it is referred as EXB). A clock signal CLK is input to each block. The IFB 1 includes an instruction register 2 for storing a fetched instruction, and an output 3 of the instruction register 2 is inputted to the DECB 4. The DECB 4 includes a decode signal register 5 for storing a decoded signal of output 3 of the instruction register 2, and an output 6 of the decoded signal register 5 is inputted to the EXB 7. In the EXB 7, ALUA and ALUB are inputted as input data, and ALUCNT is inputted as a control data to an arithmetic logic unit 20 (hereinafter, it is referred as ALU). An output 23 of the ALU 20 is inputted to an execution (EX) register 30 for storing an execution result. The signals ALUA, ALUB, ALUCNT are determined by the output 6 of the decode signal register 5.

A pipeline processing flow of the computer system having the above mentioned configuration is described with a timing chart. FIG. 11 is a timing chart describing the work flow of the conventional computer system. As shown In the FIG. 11, an instruction fetch processing of the instruction 1 is performed in the period "a".

Next, when the period "b" starts, the instruction code of the instruction 1 is stored in the instruction register 2. In addition, at the period "b", the IFB 1 fetches the instruction 2, and the decoded signal of the instruction 1 is generated by the DECB 4 by decoding the output 3 of the instruction register 2.

Next, when the period "c" starts, the decoded signal of the instruction 1 is stored in the decode signal register 5. In addition, at the period "c", the IFB 1 fetches the instruction 3, the decoded signal of the instruction 2 is generated by the DECB 4, and the data processing regarding the specified operand data is executed by the EXB 7 according to the decoded signal of the instruction 1 outputted from the decode signal register 5.

Next, when the period "d" starts, the execution result of the instruction 1 is stored in the EX register 30. In addition, at the period "d", the IFB 1 fetches the instruction 4, the decoded signal of the instruction 3 is generated by the DECB 4, and the data processing is executed by the EXB 7 according to the decoded signal of the instruction 2.

As shown above, at the period "a", the instruction 1 is fetched from the memory, and at the period "d", the execution result is stored into the EX register 30. This series of processing is executed as the pipeline processing, and the instructions are processed one after another.

The processing execution time by the EXB 7 depends on the data value to be executed. Therefore, the case requiring the longest execution time in the assumed processing will be a bottle-neck in processing for pipeline acceleration. The case requiring the longest execution time is called a "critical path". The critical path depends on the data value to be executed. For example, in the case of an addition or subtraction processing, the number of the carry shift caused in the processing becoming maximum will be a critical path.

In the conventional computer system, in order to secure the correct operation, the computer system can do nothing but set the frequency of the clock CLK provided to each block as the frequency by which the critical path is correctly executed by the EXB7. This means that the highest clock frequency is limited up to the frequency by which the severest case of the critical path can be processed correctly. How often the critical path is caused depends on the data to be actually processed in the computer system. However, in the most cases, the incidence of the critical path is assumed to be low enough so that almost all of the processing assumed to be actually processed is executed in a shorter execution time and is finished within the clock period correctly, or the critical path is not generated in the actual processing as a result. However, in these cases, when the possibility of the critical path occurrence should be considered, the clock cycle is not permitted to be shortened, so improved processing performance of the computer system cannot be achieved. Therefore, with the foregoing in mind, it is an object of the present invention to provide a computer system in which the pipeline is operated at the clock frequency higher than the clock frequency by which the critical path can be executed correctly, and to provide a computer system which can improve the processing performance and secure the correct operation for the critical path.

SUMMARY OF THE INVENTION

In order to achieve the objects, a computer system of the present invention employs a pipeline operation wherein the pipeline is driven by a high clock frequency higher than the low clock frequency by which a critical path instruction in processed data can be executed correctly, including a high frequency ALU driven by the pipeline clock frequency, a low frequency ALU driven by a low clock frequency lower than the pipeline clock frequency, by which low clock frequency the critical path instruction can be executed correctly, wherein, if the high frequency ALU can execute an instruction correctly, the output to the high frequency ALU is outputted as an execution result of the pipeline execution stage, and if the high frequency ALU cannot execute the instruction correctly, the output of the low frequency ALU is outputted as an execution result of the pipeline execution stage.

This embodiment makes it possible to secure the correct pipeline operation as a whole. The computer system employs a high frequency ALU and a low frequency ALU. The entire processing speed can be increased by the high speed operation by the high frequency ALU, and when the data belonging critical path cannot be executed in a basic cycle by the high frequency ALU, the data are executed surely by the low frequency ALU instead.

It is preferable that the low frequency ALU is a plurality of low frequency ALUs, the low frequency ALU in charge of the execution stage is switched among ALUs in turn, and each low frequency ALU executes the assigned execution stage instruction correctly by the low clock frequency which is lower than the clock frequency by which a critical path instruction can be executed correctly.

This embodiment makes it possible to obtain a correct execution result and confirm whether or not the executed result processed at a high frequency by the high frequency ALU is correct. The computer system may employ plural low frequency ALUS, and each low frequency ALU is in charge of an execution stage of pipeline which also is operated in a high frequency. When the processing instruction is a critical path, the low frequency ALU in charge executes the critical path instruction at a sufficiently low frequency.

It is preferable that the number of the plural low frequency ALUs is "n" when the pipeline clock frequency is "n" times of the clock frequency by which a critical path instruction can be executed correctly, and each of the "n" pieces of the low frequency ALUs is in charge of one of the "n" pieces of execution stages in order in the pipeline respectively. The "n" pieces of the low frequency ALUs are employed in order to cooperate and share each execution stage of the pipeline operated by the pipeline clock frequency corresponding to "n" times of the clock frequency by which the critical path can be executed correctly.

It is preferable that the computer system further includes a comparator comparing the output of the high frequency ALU and the output of the low frequency ALU obtained in the same execution stage for the same instruction. First, the output of the high frequency ALU is assumed as the execution result of the pipeline execution stage. When the compared result of the comparator indicates matching, the output of the high frequency ALU is determined as the execution result of the execution stage and the pipeline operation is continued. When the compared result of the comparator indicates mismatching, the output of the high frequency ALU is replaced with the output of the low frequency ALU as the execution result of the pipeline execution stage.

This embodiment makes it possible to secure the correct pipeline operation as a whole. The computer system normally outputs the output of the high frequency ALU as it is as the execution result of the pipeline execution stage, and confirms whether it is correct or not by comparing it with the output of the low frequency ALU. If the correct execution result is not obtained by the high frequency ALU, an error recovery processing for replacing the output of the high frequency ALU with the output of the low frequency ALU is conducted.

It is preferable that when the compared result of the comparator indicates mismatching, all stages of the pipeline are stopped until finishing the replacement process in which the output of the low frequency ALU is selected as the execution result of the pipeline execution stage.

As an error recovery processing, the pipeline operation is stopped for the number of machine cycles in order to conduct the replacement processing for the output of the low frequency ALU as the execution result of the execution stage, and for synchronization of the pipeline stages.

It is preferable that the computer system further includes a counter counting the number of occurrences of the mismatching in a predetermined period, and a circuit varying the pipeline clock frequency according to the counted number.

This embodiment makes it possible to vary the pipeline clock frequency by detecting the incidence of the critical path in the data to be actually processed and varying the pipeline clock frequency according to the critical path incidence. When a critical path instruction is executed, an error recovery process to replace the output of the low frequency ALU as the execution result of the execution stage is operated, and the deterioration of the system throughput becomes large if the number of the critical path instruction is larger than the predetermined number. In this case, it is better to decrease the pipeline frequency in order to decrease the number of the critical path instructions for the system throughput as a whole.

It is preferable that the amounts of two processes are compared when the pipeline clock frequency is increased and the number of the critical path instructions is increased. The one is the improved process amount of the high frequency ALU and the other is the deteriorated process amount by increasing the replacement process of the output of the low frequency ALU as the execution result of the pipeline stage when the high frequency ALU cannot execute the instruction correctly. When the former is larger than the latter by a predetermined amount, the pipeline clock frequency is increased.

It is preferable that the amounts of two processes are compared when the pipeline clock frequency is decreased and number of the critical path instructions is decreased. The one is the deteriorated process amount of the high frequency ALU if the pipeline clock frequency is lowered, and the other is the improved process amount by decreasing of the replacement process of the output of the low frequency ALU as the executed result of the pipeline stage when the high frequency ALU cannot execute the instruction correctly. When the latter is larger than the former by a predetermined amount, the pipeline clock frequency is decreased.

In another words, the following merit and demerit may be compared. The merit is the increase of the ability of the high frequency ALU by increasing the pipeline frequency, and the demerit is the increase of the number of the error recovery processing for the replacement process. If the merit is larger than the demerit, system throughput may be increased by increasing the pipeline frequency.

On the other hand, the following demerit and merit may be compared. The demerit is the deterioration of the ability of the high frequency ALU by decreasing the pipeline frequency, and the merit is the decrease of the number of the error recovery processing for the replacement process. If the merit is larger than the demerit, system throughput may be increased by decreasing the pipeline frequency.

It is preferable that the computer system further includes plural ALUs, a data generation circuit generating test data as a critical path, an execution time measurement circuit measuring the critical path instruction in each ALU, and a detector detecting the fastest ALU that can execute the critical path instruction in a shortest time, wherein, the ALU detected by the detector is selected as the high frequency ALU, and the other ALU or ALUs is/are selected as the low frequency ALU/ALUs.

This embodiment makes it possible to maximize the system throughput by using the fastest ALU of the provided plural ALUs. Among plural ALUs prepared in the computer system, the fastest ALU that can execute a critical path test data is detected and used as the high frequency ALU. Herein, the critical path execution time of each ALU may be defined as either the critical path execution time in each ALU or the sum of the execution time in each ALU and the time from the moment when the executed result is outputted until the moment when the outputted executed result is stored in the register that stores the execution result.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention of the computer system employing the pipeline will be described by way of embodiments with reference to the accompanying drawings of FIG. 1 to FIG. 9.

Embodiment 1

Figure 1:
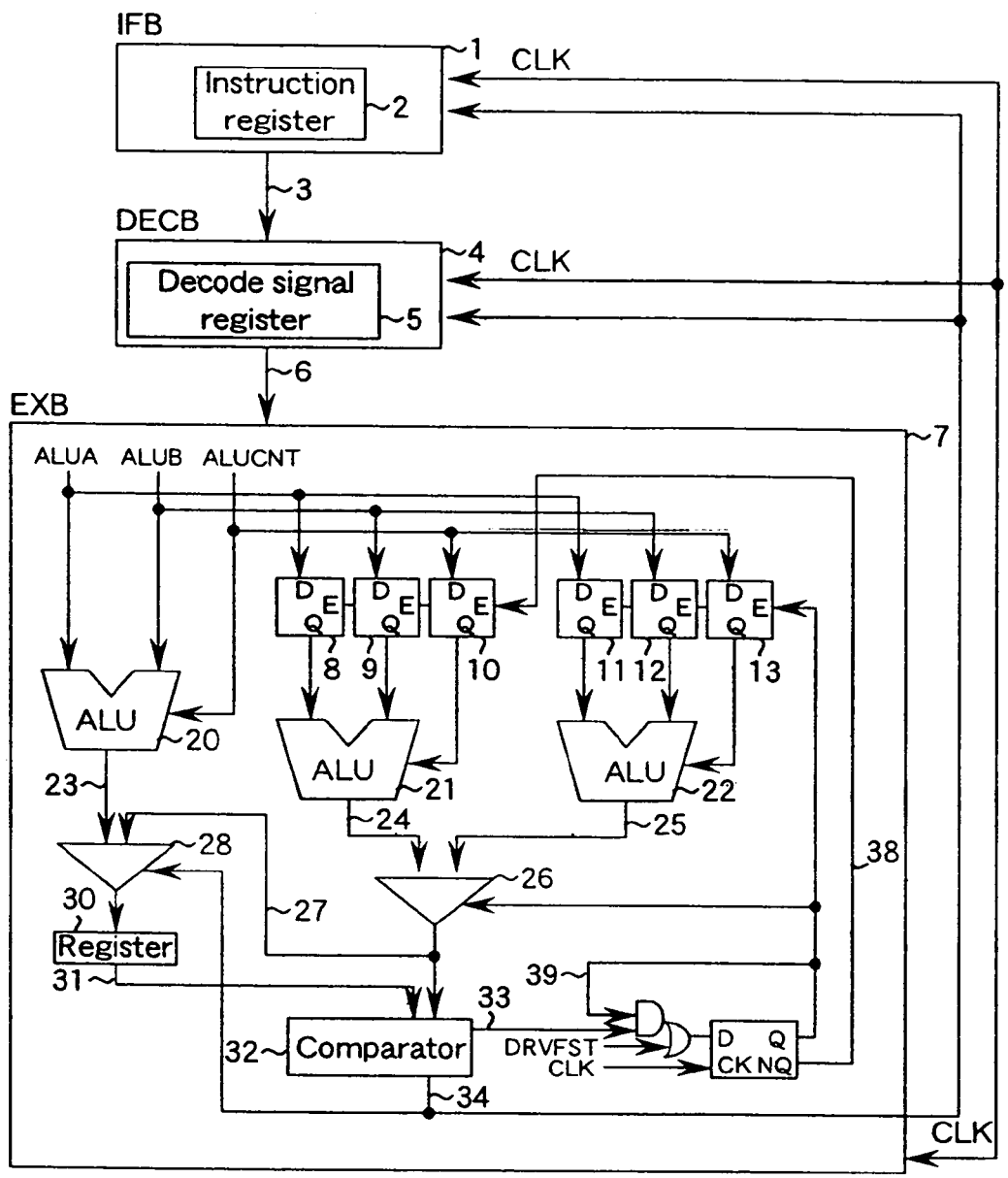
FIG. 1 is a schematic block diagram showing a computer system according to Embodiment 1 of the present invention.

FIG. 1 is a schematic block diagram showing a computer system according to Embodiment 1 of the present invention. In this FIG. 1, an IFB 1, an instruction register 2, an output 3 of the instruction register 2, a DECB 4, a decode signal register 5, and an output 6 of the decode signal register 5 are the same elements described in the prior art.

In this Embodiment 1, the EXB 7 includes a high frequency ALU 20 operated at the same clock frequency as the pipeline clock frequency, and two pieces of ALUs (the low frequency ALU 21 and the low frequency ALU 22) operated at the clock frequency in which a critical path can be executed correctly. A latch 8 storing input data ALUA, a latch 9 storing input data ALUB, and a latch 10 storing a control signal ALUCNT are connected to the ALU 21. A latch 11 storing input data ALUA, a latch 12 storing input data ALUB, and a latch 13 storing a control signal ALUCNT are connected to the ALU 22.

Furthermore, the EXB7 includes a selector 26 whose input signals are the output signals of the ALU 21 and the ALU 22, a selector 28 whose input signals are the output signal 23 of the ALU 20 and the output signal of the selector 26, and a comparator 32 whose input signals are the output signal of the register 30 and the output signal of the selector 26. The comparator 32 outputs either a signal 33 indicating the matching between input signals or a signal 34 indicating the mismatching between input signals. The mismatching signal 34 is inputted to the IFB 1 and the DECB 4.

The following data, input data to the ALU 21, an enable signal 38 as a control signal to the latches 8, 9 and 10, input data to the ALU 22, and an enable signal 39 as a control signal to the latches 11, 12 and 13, are generated according to the matching signal 33 and a DRVFST indicating the initial cycle when the decode register becomes effective. The selector 26 is installed in order to switch the low frequency ALU 21 and the low frequency ALU 22 alternately by each execution stage in the pipeline. With the configuration shown in FIG. 1, the low frequency ALU 21 and the low frequency ALU 22 are in charge of the execution stage alternately, and the ALU 21 and the ALU 22 can execute the execution stage processing at low clock frequency, that is half clock frequency of the pipeline frequency. By using the low frequency ALU, the execution stage can be executed at the clock frequency lower than the clock frequency by which the critical path can be executed correctly.

In the above example shown by FIG. 1, the low frequency ALUs are the two ALU 21 and ALU 22. However, when the pipeline frequency is "n" times of the clock frequency by which the critical path can be executed correctly, "n" pieces of ALUs should be provided to share the processing, and "n" pieces of the low frequency ALUs are switched alternately in order to be in charge of one of the "n" series of pipeline execution stages respectively. In this case, there are "n" pieces of the low frequency ALUs so that one-low frequency ALU operates a comparatively long period corresponding to the 1/n clock frequency of the pipeline clock frequency.

The comparator 32 is installed in order to compare the output of the high frequency ALU 20 obtained initially as an execution result of the execution stage and the output of either of the low frequency ALU 21 or the low frequency ALU 22 for the same execution stage. By the configuration shown in FIG. 1, the comparator 32 compares the following two output signals. One is the speculatively selected signal of the output register 30 as an output of the pipeline execution stage wherein the output register 30 stores the checking result of the output of high frequency ALU 20. The other is the output of the selector 26 selecting the low frequency ALU which is in charge of the same execution stage to be compared.

When the comparing result of the comparator 32 indicates matching, the high frequency ALU 20 is operating the execution processing correctly, so the pipeline does not need to be stopped, and the output signal of the output register 30 is selected as the output of the execution result. When the comparing result of the comparator 32 indicates mismatching, the high frequency ALU 20 cannot operate the execution processing correctly, the selector 28 is switched by the signal 34 from the comparator 32 to select either the output of the low frequency 21 or the output of the low frequency 22 and the output signal of the output register 30 is replaced with the selected low frequency ALU output as the execution result of the execution stage. Such a kind of an error recovery processing is executed.

In addition, when the comparing result of the comparator 32 indicates mismatching, the synchronization of the pipeline processing is kept by stopping the operation of all stages in the pipeline temporarily by finishing the replacement processing by which either the output of the low frequency ALU 21 or the output of the low frequency ALU 22 is replaced with the output of the output register 30. Each pipeline stage is stopped by inputting the mismatching signal 34 of the comparator 32 to the IFB 1 and DECB 4. Furthermore, the synchronization of the execution stage is also kept by stopping the input stage of the low frequency ALU 21 and the ALU 22 because the matching signal 33 is not outputted so that the ALU input enable signals 38 and 39 are not generated.

Figure 2:
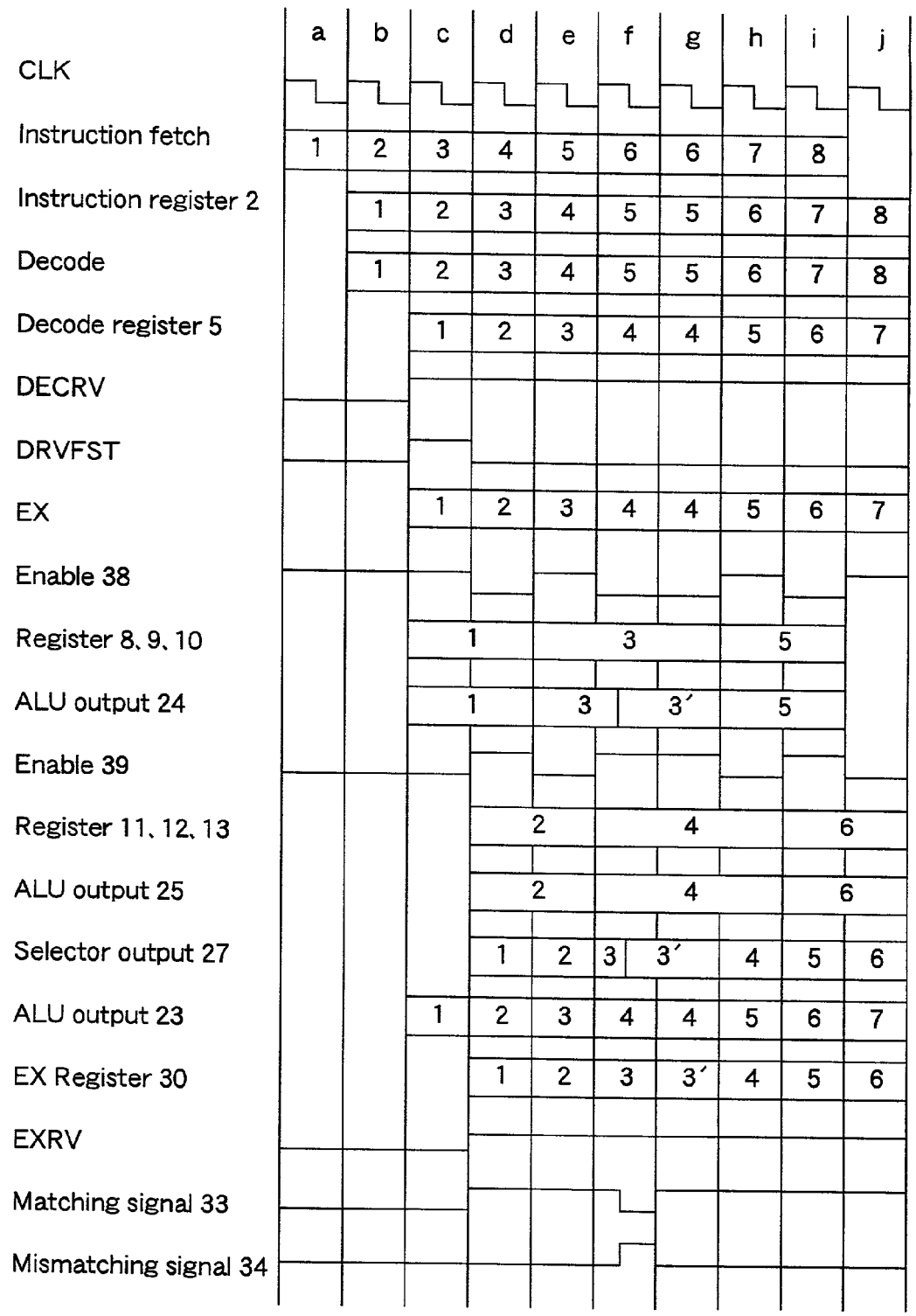
FIG. 2 is a timing chart showing a processing flow of the computer system according to Embodiment 1 of the present invention.

The processing flow of the computer system of this Embodiment 1 is described in detail by referring the timing chart shown in FIG. 2.

The fetch operation of the instruction 1 is executed in the IFB1 for the period of "a" in FIG. 2.

Next, when the period "b" starts, the instruction code of the instruction 1 is stored in the instruction register 2, then the instruction code is decoded and the decode signal of the instruction 1 is generated at the DECB 4. The next instruction 2 is fetched in the IFB 1.

Next, when the period "c" starts, the decoded signal of the instruction 1 is stored into the decode signal register 5, and the data processing between specified operand data is executed by the EXB 7 according to the decoded signal of the instruction 1 outputted from the decode signal register 5. Instruction 1 is executed as an execution stage in the pipeline in the high frequency ALU 20, and the execution result of the instruction 1 is obtained as the output 23 of the ALU 20, and the low frequency ALU in charge is selected. The decode register valid signal DRCRV becomes effective from the period "c", and signal DRVFST indicating the initial cycle of DECRV becomes effective. In the period "c", the enable signal 38 becomes high and the data and the control signal for executing the instruction 1 are inputted to the latches 8, 9, and 10. In this example, in the period "c", the ALU 21 is selected, the ALU 21 executes an operation during two machine cycles, and then the output 24 is obtained. In addition, the instruction 3 is fetched in the IFB 1 and the instruction 2 is decoded in the DECB 4 in the period "c".

Next, when the period "d" starts, the execution result processed according to the instruction 1 is stored in the EX register 30, and the instruction 2 is operated in the EXB 7. First of all, the high frequency ALU 20 executes the instruction 2 as the pipeline execution stage, the execution result of the instruction 2 is obtained as the output 23 of the ALU 20, and the low frequency ALU selected as the low frequency ALU in charge for executing the instruction 2 in the period "c" is switched from the ALU 21 to the ALU 22. The output of the selector 26 and the output of the ALU 20 are inputted to the selector 28, and the output of the selector 26 is selected only in case the mismatching signal 34 is high and inputted to the register 30. The enable signal 38 turns to be low level by DRVFST, and data and a control signal for executing the instruction 1 are kept in the latches 8, 9, and 10. On the other hand, in the period "d", the enable signal 39 turns to be high level, and data and a control signal for executing the instruction 2 are kept in the latches 11, 12, 13. Thus, the ALU 21 executes the instruction 1 for the period of "d" as well as the period of "c". As a result, the instruction 1 is executed during two cycles of period "c" and period "d". The ALU 22 begins the execution of the instruction 2 for the period of "d", and the execution result of the instruction 2 is obtained as the output 25. As described as follows, the ALU 22 executes the instruction 2 during the period of "e". As a result, the instruction 2 is executed during two cycles of period "d" and period "e". In addition, the verification processing and the output processing of the execution result of the instruction 1 are operated for the period of "d". First of all, EXRV indicating the effectiveness of the EX register 30 becomes high, and the EXRV is inputted into the comparator 32. When the EXRV is high and the data in the EX register 30 and the output of the low frequency ALU selected by the selector 26 match, the matching signal 33 becomes high level. If these does not match, the mismatching signal 34 becomes a high level. In the period of "d", the enable signal 39 is high level, the output of the ALU 21 is selected by the selector 26, and then the output of the ALU 21 and the output of the register 30 are compared by the comparator 32. The execution result of the instruction 1 by the high frequency ALU 20 in one machine cycle and the execution result of the instruction 1 by the low frequency ALU 21 in two machine cycles are compared. In this example, the instruction 1 is finished within the basic machine cycle, so the output of the register 30 and the output of the ALU 21 matches, so the correct operation in the ALU 20 is confirmed and the matching signal 33 becomes high, and the output of the register 30 (this is the execution result of the instruction 1 executed by the high frequency ALU 20 in one machine cycle) becomes the output of the EXB 7 of the pipeline execution stage. Thus, the instruction 1 can be executed by the pipeline processing correctly at the high frequency. In addition, the instruction 4 is fetched in the IFB 1 and the instruction 3 is decoded in the DECB 4 in the period "d".

Next, the processing operation when the high frequency ALU 20 cannot be executed in one machine cycle is described for three periods "e", "f", "g". In the period of "e", the high frequency ALU 20 executes the instruction 3 in one machine cycle, however, in this example, the instruction 3 is assumed as a critical path and the high frequency ALU 20 cannot complete the execution of the instruction 3 in one machine cycle.

In the period of "e", the execution result executed according the instruction 2 is stored in the EX register 30, and the instruction 3 is executed in the EXB 7. In the following description, the description in the same part as the period of "c" is roughly described. First of all, the instruction 3 is executed as an execution stage in the pipeline in the high frequency ALU 20, and the execution result "3" of the instruction 3 is obtained as the output 23 of the ALU 20. While, the low frequency ALU in charge of the instruction 3 is switched from the ALU 22 which is currently selected in the period of "d", to the ALU 21. In the period of "e", the enable signal 38 turns to be high according to the high level of the matching signal 33 in the previous cycle. According to the enable signal, data and the control signal to execute the instruction 3 are inputted to the latches 8, 9, and 10. On the other hand, the enable signal 39 is low in the period of "e", and data and the control signal to execute the instruction 2 are kept in the latches 11, 12 and 13. Thus, the ALU 22 executes the instruction 1 for the period of "e" as well as the period of "d". As a result, the instruction 2 is executed during two cycles of period "d" and period "e". The ALU 21 begins the execution of the instruction 3 for the period of "e", and the execution result "3" of the instruction 3 is obtained as the output 25 at the first 1 machine cycle. As described as follows, the ALU 21 executes the instruction 3 and obtains the correct execution result "3" at the next period of "f", which is the second machine cycle for execution of the instruction 3. In addition, as the verification processing and the output processing of the execution result of the instruction 2 for the period of "e", the output of the ALU 22 and the output of the register 30 are compared by the comparator 32 because the enable signal 39 is low and the output of the ALU 22 is selected by the selector 26. In this example, the instruction 2 is finished within the basic machine cycle, so the matching signal 33 becomes high, and the output of the register 30 (this is the execution result of the instruction 2 executed by the high frequency ALU 20 in one machine cycle) becomes the output of the EXB7 of the pipeline execution stage.

Next, in the period of "f", the execution result of the instruction 3 by the high frequency ALU 20 stored in the EX register 30 is replaced with the result of the instruction 3 by the low frequency ALU 21 as follows. First of all, the high frequency ALU 20 receives next instruction 4 from the decode register 5 and starts the execution. The execution result "4" of the instruction 4 is obtained as the output 23 of the ALU 20. The low frequency ALU for executing the instruction 4 is switched from the ALU 21 currently selected in the period of "e" to the ALU 22 as the same operation in the period of "d". The ALU 21 executing the instruction 3, which is a critical path, during two machine cycles of the period of "e" and "f" can obtain correct execution result at the second machine cycle period of "f". In this case, at first cycle period of "e", the output of the ALU 21 was obtained as "3" the same as that of the high frequency the ALU 20, then at second machine cycle period of "f", the output of the ALU 21 changes to be the correct result "3'". Next, the verification processing and the output processing of the execution result of the instruction 3 for the period of "f" are conducted. In the period of "f", the output 24 of the ALU 21 and the output 31 of the register 30 are compared by the comparator 32 because the output of the ALU 21 is selected by the selector 26. However, at the time when the output 24 of the ALU 21 turns from "3" to "3'", the mismatching 34 turns to be high and the matching signal turns to be low. The mismatching signal 34 is provided to the selector 28 as a control signal, the selector 28 selects the output 27 of the selector 26, which is the output 24 ("3'") of the low frequency ALU 21. For processing the above mentioned replace processing, it is necessary to stop the operation of the pipeline stage and each logic circuit temporarily, and maintain the status until the period of "g". The mismatching signal 34 is inputted to the IFB 1 and DECB 4. The IFB 1 keeps the signal of the instruction register 2 and fetches the instruction code 6 again, and the DECB 4 keeps the signal in the decode register 5.

In the period of "g", the enable signal 38 and 39 are not inverted, and the signals of the latches 8, 9 and 10 are kept. The output of the selector 26 is selected by the selector 28 according to the mismatching signal 34 as high in the previous cycle, and the output signal "3'" of the selector 26 is stored in the register 30. By this replacement, the signal of the register 30 and the output signal of the selector 27 matches, so the matching signal 33 turns to be high.

In the period of "h", the enable signal 38 and 39 are inverted according to the matching signal 33 as high in the previous cycle, and normal operations are executed repeatedly.

As shown above, the computer system of Embodiment 1 includes two pieces of the low frequency ALU (ALU 21 and ALU 22) in addition to the high frequency ALU used in the normal execution stage in the pipeline operation, the enable signal 38 and the enable signal 39 as the input signal for the ALU 21 and ALU 22 respectively always show different logic (the one is high when the other is low), and these enable signals are inverted when the input data for ALU 20 is renewed. It becomes possible that all instructions to be executed in the pipeline operation are executed alternately by two machine cycles by low frequency ALU 21 and low frequency ALU 22. When the execution result of the high frequency ALU 20 and the execution result of either the low frequency ALU 21 or the low frequency ALU 22 which is currently selected do not match, in other words, the instruction corresponding to the critical path is not executed correctly within the basic cycle by the high frequency ALU 20, the recovery processing for the error caused by a high frequency pipeline operation is conducted by replacing the signal of the register 30 with the result of the selected low frequency ALU. The subsequent instruction executions can be continued without error by keeping the signal of the instruction register 2 and the decode signal register 5 at the above replacement operation.

In the above example shown in this Embodiment 1, the low frequency ALU are two pieces of ALU 21 and ALU 22. However, the pipeline frequency can be increased up to "n" times of the clock frequency by which the critical path can be executed correctly, by employing "n" pieces of low frequency ALUs.

As shown above, the computer system shown in this Embodiment 1, by employing a high frequency ALU and low frequency ALUs, the entire processing speed can be increased by the high speed operation by the high frequency ALU, and when the data belonging critical path cannot be executed in a basic cycle by the high frequency ALU, the data are executed surely by the low frequency ALU instead, and the correct pipeline operation is secured as a whole.

Embodiment 2

Next, a computer system according to Embodiment 2 of the present invention is described. The computer system employs the function for adjusting a pipeline frequency considering an incidence of the critical path included in the data actually to be processed.

In this embodiment 2, the computer system includes a counter for counting the number of occurrences of the above-mentioned mismatching detection signal of a certain period in order to detect the incidence of the critical path in the actually processed data. The computer system also includes a circuit for modifying the driving frequency of the pipeline according to the counted number. In order to conduct the adjustment of the clock frequency according to the critical path incidence, the threshold of the upper threshold and the lower threshold of the number of the critical path occurrence is set, and if the number of the mismatching signal 34 of the comparator 32 explained in Embodiment 1 in a predetermined period exceeds the upper threshold, the pipeline frequency is decreased. If it falls below the lower threshold, the pipeline frequency is increased.

Figure 3:
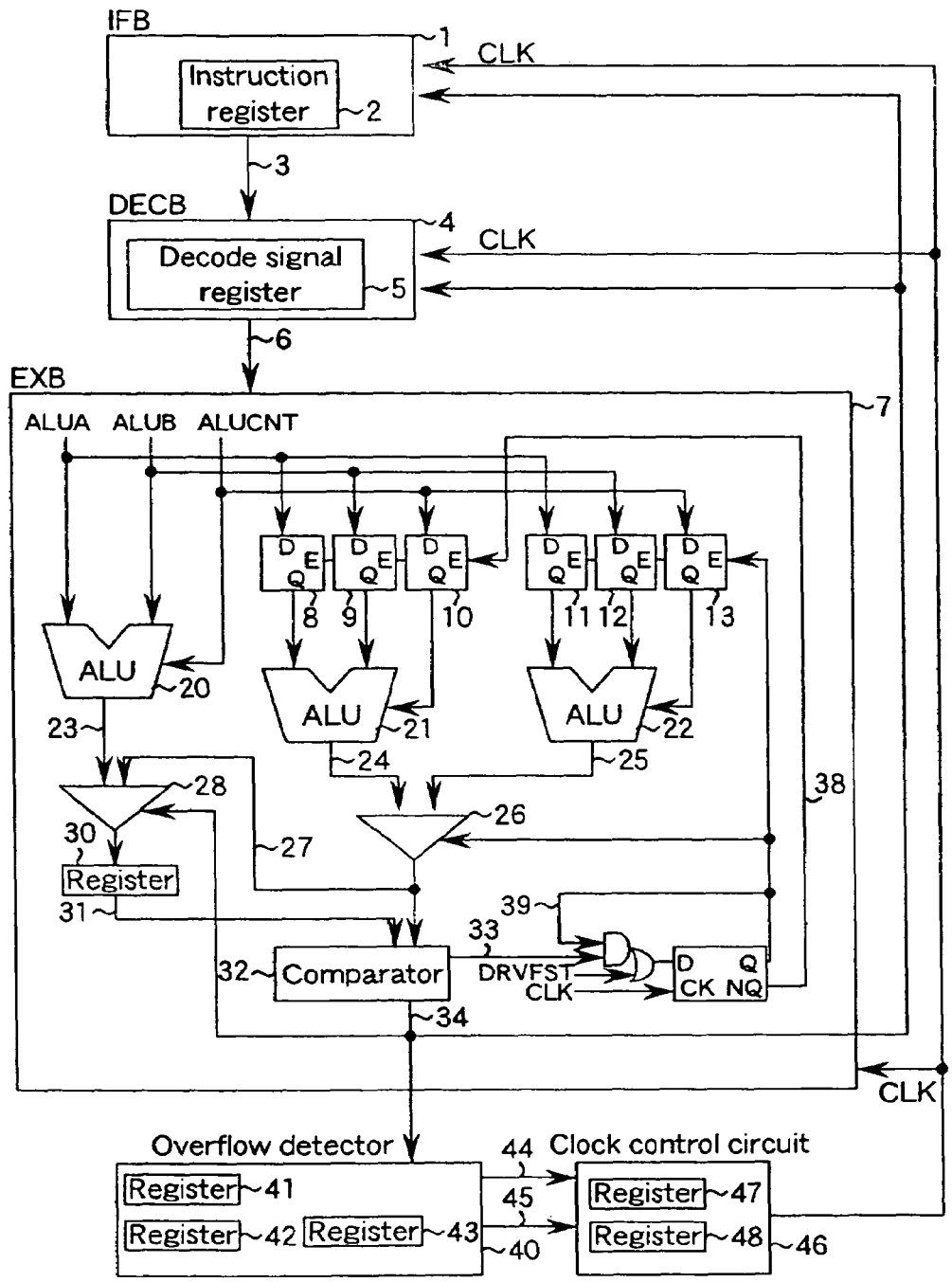
FIG. 3 is a schematic block diagram showing a computer system according to Embodiment 2 of the present invention.

FIG. 3 is a schematic block diagram showing a computer system employing the above mentioned first adjustment method according to Embodiment 2 of the present invention. As shown in the computer system in FIG. 3, the mismatching signal 34 of comparator 32 is inputted to the overflow detector 40. The overflow detector 40 includes a detection period set register 41, a minimum detection number set register 42 and a maximum detection number set register 43. The clock control circuit 46 includes an initial frequency set register 47 and a frequency varying amount set register 48. The signal CLKUP 44, which requests the increase of the clock frequency, and the signal CLKDOWN 45, which requests the decrease of the clock frequency, are inputted to the clock control circuit 46 from the overflow detector 40. The pipeline frequency is driven by the frequency set in the initial frequency set register 47, and afterwards, it is adjusted step by step with a value set in the frequency varying amount set register 48 by the clock control circuit 46. When the number of the overflow detected by the overflow detector 40 exceeds the value set in the maximum detection number set register 43, the signal CLKDOWN 45 becomes high. The signal CLK is decreased by the value set in the frequency varying amount set register 48 by the clock control circuit 46, and the decreased CLK is outputted at the following cycle. When the number of the counted mismatching signal 34 in a predetermined period set in the detection period set register 41 falls below the value set in the minimum detection number set register 42, the signal CLKUP 44 becomes high, and the signal CLK is increased by the value set in the frequency varying amount set register 48 by the clock control circuit 46.

According to this configuration, when the occurrence of the mismatching happens frequently, the signal CLK is lowered in order to suppress the deterioration of the system performance, and when the occurrence of the mismatching rarely happens, the signal CLK is increased in order to improve the system performance.

In the above mentioned processing, it is important how to set the upper threshold and the lower threshold. After all, the adjustment of the pipeline frequency is operated by comparing the increase of the system performance by increasing the pipeline frequency and the deterioration of the system performance by increasing of the error recovery processing because of increases in the occurrence of the critical path according to increasing the pipeline frequency, and if the former system performance increase is large, the pipeline frequency will be increased, while if the latter system performance deterioration is large, the pipeline frequency will be lowered. Therefore, the upper threshold and the lower threshold of the number of the overflow should be set to satisfy the above mentioned relationship.

Figure 4:
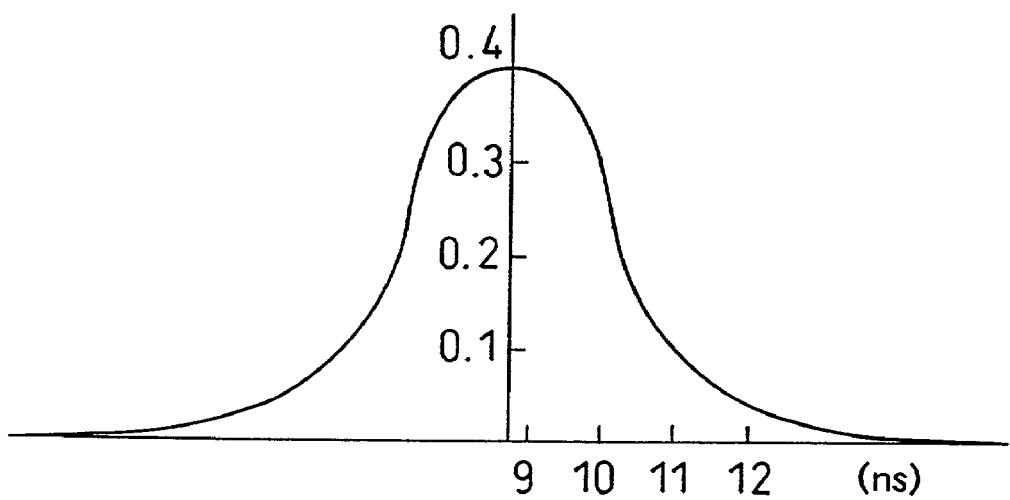
FIG. 4 is a schematic diagram showing one example of the distribution of the execution time of each instruction executed by the computer system according to Embodiment 2 of the present invention.

The method for setting the upper threshold and the lower threshold of the number of the overflow is described below. FIG. 4 is a schematic diagram showing one example of the distribution between the execution time of each instruction. In order to simplify the description, the distribution of the execution time of each instruction is assumed to follow a regular distribution. It is understood that about 70% instructions complete the processing within 10 ns, about 90% instructions complete the processing within 11 ns, and about 97% instructions complete the processing within 12 ns as seen in FIG. 4. For example, the time necessary to execute 100 pieces instructions is calculated for studying the condition under which the instruction is executed by showing the distribution of FIG. 4 and the pipeline frequency is varied 10 ns, 11 ns, and 12 ns. Here, it is assumed that the machine cycle for the basic cycle (it is one machine cycle here) is spent for an error processing as a penalty.

(processing time at 10 ns) 70×10+30×20=1300

(processing time at 11 ns) 90×11+10×22=1210

(processing time at 12 ns) 97×12+3×24=1236

It is preferable to adjust the pipeline frequency as one cycle becomes 11 ns, in other words, as the number of the overflow becomes about 10% of the entire instructions for the instruction group whose distribution is as shown in FIG. 4. It is enough to set the upper threshold of the overflow number to be smaller than the number about 30% of the entire instruction (the number corresponding the case driving at 10 ns) and the lower threshold of the overflow number to be larger than the number about 3% of the entire instructions (the number corresponding the case driving at 12 ns). For instance, the number of the upper threshold is assumed as "29" and the number of the lower threshold is assumed as "4" for 100 instructions.

As shown above, if the distribution between the processing execution time of the instruction group is already-known, the value to be set in the maximum detection number set register 43, which determines the upper threshold, and the value to be set in the minimum detection number set register 42, which determines the lower threshold, can be set.

Next, the adjusting method for general use in case that the distribution between the processing execution time of the instruction group is not known is described. For instance, the value in the initial machine cycle set register 47 is set as "t"ns, the value in the machine cycle varying amount set register 48 is set as "$\Delta t$" ns, the value in the detection period set register 41 is set as "m", the number of the instruction which causes overflow when the machine cycle is t ns is "n", and the varying number of the instruction that causes overflow when the machine cycle is varied $\Delta t$ ns is "$\Delta n$". The overflow number lower threshold (in the following description, the value is the threshold for adjusting whether or not one machine cycle time is increased and too fast pipeline frequency is lowered) and the upper threshold of the overflow number (in the following description, the value is the threshold for adjusting whether or not one machine cycle time is decreased and the pipeline frequency is enhanced) are studied.

The processing time in the initial machine cycle becomes (Equation 1).

$$(t \times m + t \times n) \qquad \text{(Equation 1)}$$

First of all, the lower threshold of the overflow number is studied. When 1 machine cycle is increased "$\Delta t$" ns, the processing time will become (Equation 2).

$$(t+\Delta t) \times m + (t+\Delta t)(n-\Delta n) \qquad \text{(Equation 2)}$$

If (Equation 2) is smaller than (Equation 1), increasing the machine cycle time is useful for improving the entire throughput.

(Equation 3) can be determined when assuming t=10 ns, $\Delta t$=1 ns, m=100.

$$\Delta n > (100+n)/11 \qquad \text{(Equation 3)}$$

Figure 5A:
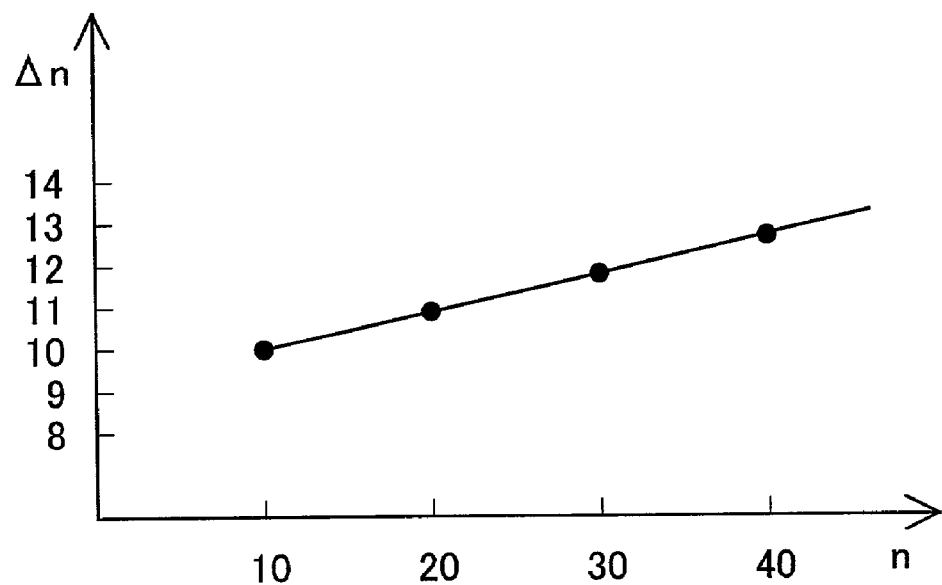
FIG. 5(a) is a schematic diagram showing the relationship between the number of the decrease of the overflow and the number of the overflow, wherein the adjustment for increasing the pipeline frequency at 1 nsec becomes advantageous.
Figure 5B:
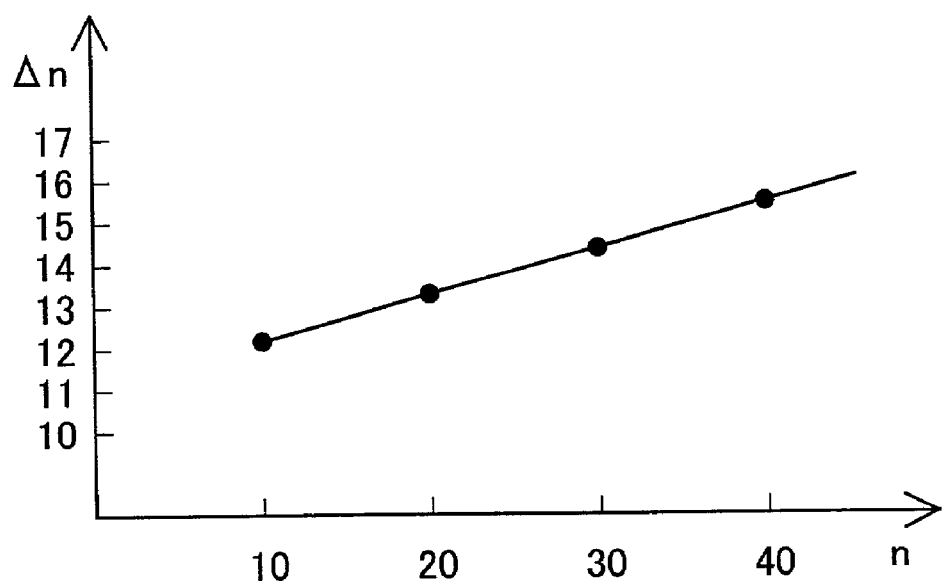
FIG. 5(b) is a schematic diagram showing the relationship between the number of the increase of the overflow and the number of the overflow, wherein the adjustment for decreasing the pipeline frequency at 1 nsec becomes advantageous.

FIG. 5(*a*) is a schematic diagram showing a graph visualizing Equation 3. The lower threshold of the overflow number is set to satisfy the relation of FIG. 5(*a*). If the overflow number falls below the overflow number lower threshold when the pipeline frequency is increased by 1 ns, the pipeline machine cycle is adjusted to be increased by 1 ns.

Next, the upper threshold of the overflow number is studied. The processing time when decreasing 1 machine cycle $\Delta t$ ns becomes (Equation 4).

$$(t-\Delta t) \times m + (t-\Delta t)(n+\Delta n) \qquad \text{(Equation 4)}$$

If (Equation 4) is smaller than (Equation 1), decreasing the machine cycle time is useful for improving the entire throughput.

(Equation 5) can be determined when assuming t=10 ns, $\Delta t$=1 ns, m=100.

$$\Delta n < (100+n)/9 \qquad \text{(Equation 5)}$$

FIG. 5(*b*) is a schematic diagram showing a graph visualizing Equation 5. The upper threshold overflow number is set to satisfy the relation of FIG. 5(*b*). If the overflow number exceeds the upper threshold of the overflow number when the pipeline frequency is decreased by 1 ns, the pipeline machine cycle does not need to be adjusted to be decreased by 1 ns.

FIG. 5 is a schematic diagram showing a boundary of how much the overflow number varies, and the processing time can be shortened as a whole under the condition that 1 machine cycle is increased or decreased by 1 ns when the initial frequency of the pipeline corresponds to 1 machine cycle per 10 ns. For example, it is assumed that the pipeline frequency corresponds to 1 machine cycle per 10 ns and the overflow number is 30 now, and then 1 machine cycle is increased by 1 ns, if the overflow number is decreased by 12 times or more and becomes 18 times or less, it is understood that the system performance will be improved when the pipeline machine cycle speed is decreased to be 11 ns or less. In the above mentioned example, if the 1 machine cycle per 10 ns and the overflow number is 30, the processing time will be 1300 ns as a whole. On the other hand, if the 1 machine cycle per 11 ns and the overflow number is 18, the processing time will be 1298 ns as a whole.

In the same way, if it is assumed that the pipeline frequency corresponds to 1 machine cycle per 10 ns and the overflow number is 30 now, and then 1 machine cycle is decreased by 1 ns, if the overflow number is increased 14 or less and becomes 44 or less, it is understood that the system performance will be improved when the pipeline machine cycle speed is increased to be 9 ns. In the above mentioned example, if the 1 machine cycle per 10 ns and the overflow number is 30, the processing time will be 1300 ns as a whole. On the other hand, if the 1 machine cycle per 9 ns and the overflow number is 44, the processing time will be 1296 ns as a whole.

As described above, the throughput of the computer system according to Embodiment 2 of the present invention can be improved by adjusting the pipeline frequency by a circuit for counting the number of the occurrence of the mismatching in the predetermined period, and a circuit for varying the pipeline frequency according to the counted number.

Embodiment 3

Next, a computer system according to Embodiment 3 of the present invention is described. The computer system of this Embodiment 3 includes plural ALU, a data generation circuit generating test data which are critical path data, an execution time measurement circuit measuring the execution time of the critical path in each ALU, a detector detecting the logic unit that can execute the critical path, wherein the ALU detected by the detector is selected as the high frequency ALU, other one ALU / plural ALUs is/are selected as the low frequency ALU.

Figure 6:
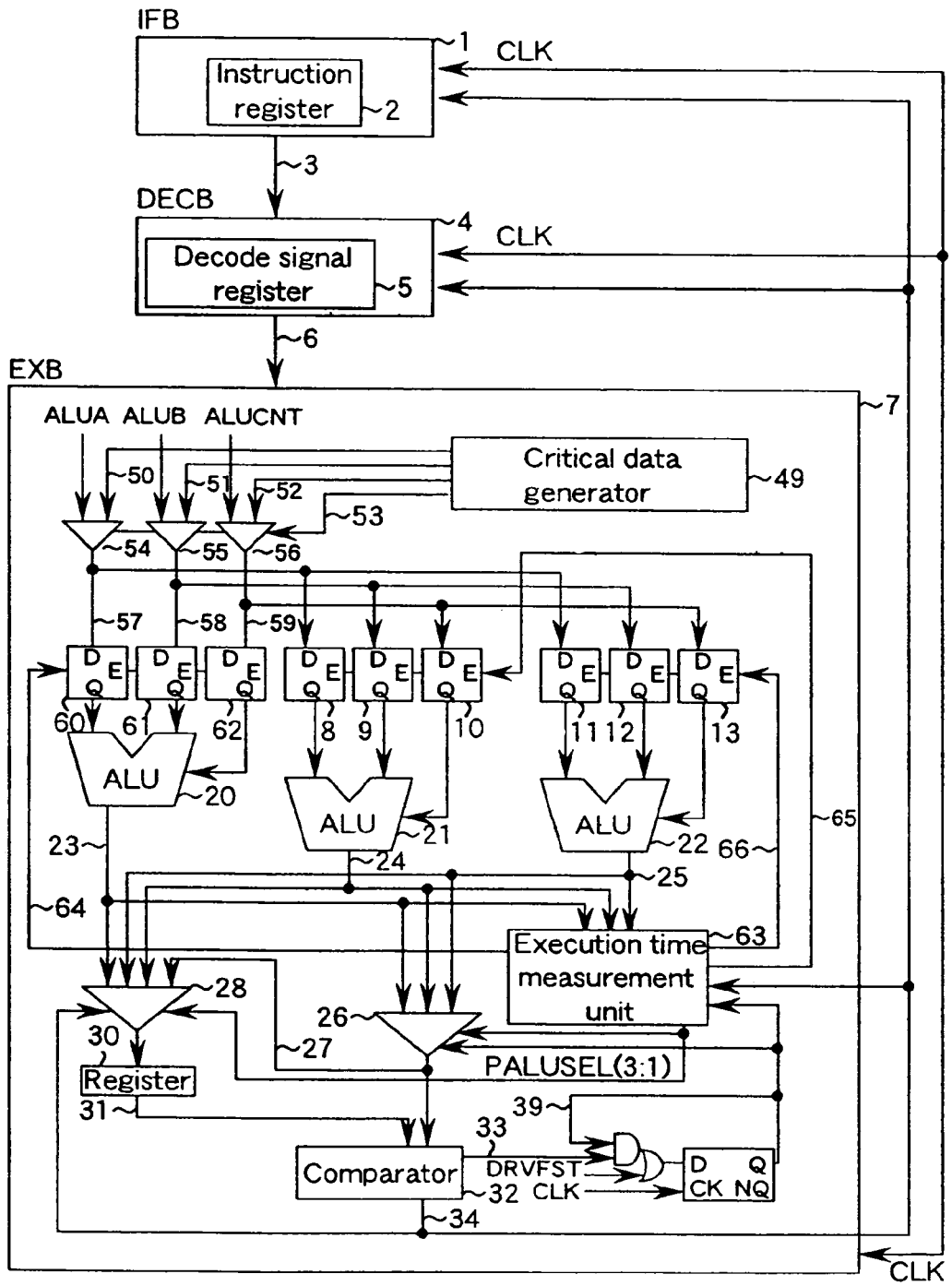
FIG. 6 is a schematic block diagram showing a computer system according to Embodiment 3 of the present invention.

FIG. 6 is a schematic block diagram showing a computer system according to Embodiment 3 of the present invention. As shown in FIG. 6, the computer system includes a critical path data generating apparatus 49 generating test data, which is a critical path data in the EXB7. A critical path data generating apparatus 49 outputs critical data 50 and 51 to be inputted to each ALU, a control signal 52 for executing a processing in the critical path and a critical select signal CDSEL 53. Regarding the ALU 20, the ALU input data latch 60 and 61 are connected to the data input terminal, and the ALU control signal latch 62 is connected to the control signal input terminal. Regarding the ALU 21, the ALU input data latch 8 and 9 are connected to the data input terminal, and the ALU control signal latch 10 is connected to the control signal input terminal. Regarding the ALU 22, the ALU input data latch 11 and 12 are connected to the data input terminal, the ALU control signal latch 13 is connected to the control signal input terminal. The ALU A and the critical data 50 are inputted to the selector 54, and the output 57 of the selector 54 are inputted to the ALU input data latch 60, 8 and 11. The ALU B and the critical data 51 are inputted to the selector 55, and the output 58 of the selector 55 are inputted to the ALU input data latch 61, 9 and 12. The ALUCNT and the critical control signal 52 are inputted to the selector 56, and the output 59 of the selector 56 are inputted to the ALU control signal latch 62, 10 and 13. Each output of the ALU 20, ALU 21 and ALU 22 is inputted to the execution time measurement unit 63, and the test data execution time in each ALU is measured. The execution time measurement unit 63 outputs a pipeline ALU select signal PALUSEL (3:1), an enable signal 64 for the input data latch and the control signal latch of the ALU 20, an enable signal 65 for the input data latch and the control signal latch of the ALU 21, and an enable signal 66 for the input data latch and the control signal latch of the ALU 22.

Figure 7:
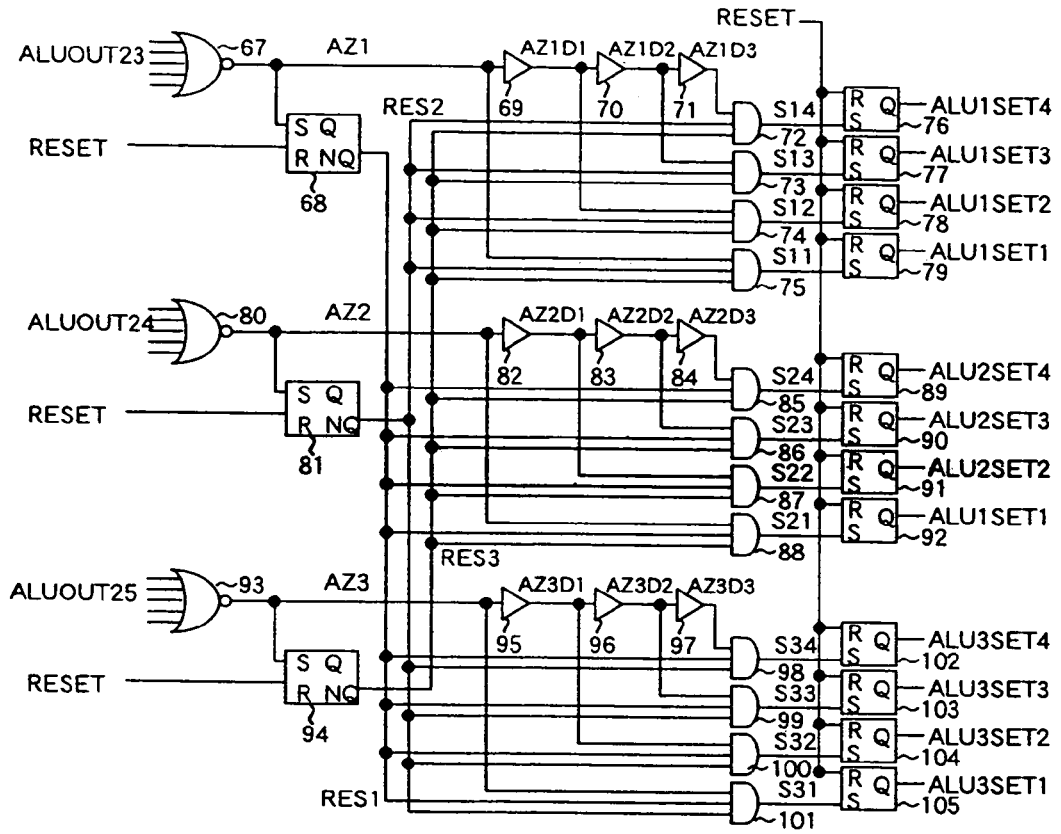
FIG. 7 is a detail circuit block diagram showing an execution time measurement unit 63 in the computer system according to Embodiment 3 of the present invention.
Figure 7:
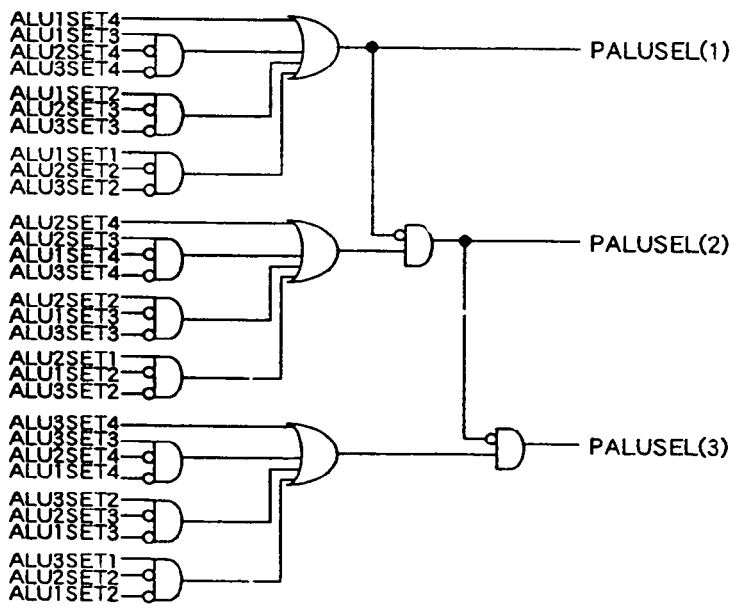

FIG. 7 is a detail circuit block diagram showing an execution time measurement 30 unit 63 in the computer system according to Embodiment 3 of the present invention. In the FIG.7, all bits of the output of the ALU 20 are inputted to the NOR gate 67, and the output of the NOR gate 67 is inputted to the delay buffer 69, the AND gate 75 and the SET terminal of the SRFF 68. The output of the delay buffer 69 is inputted to the delay buffer 70 and the AND gate 74, the output of the delay buffer 70 is inputted to the delay buffer 71 and the AND gate 73, and the output of the delay buffer 71 is inputted to the AND gate 72. The output of the AND gate 72 is inputted to the SET terminal of the SRFF 76, the output of the AND gate 73 is inputted to the SET terminal of the SRFF 77, the output of the AND gate 74 is inputted to the SET terminal of the SRFF 78, and the output of the AND gate 75 is inputted to the SET terminal of the SRFF 79. All bits of the output of the ALU 21 are inputted to the NOR gate 80, and the output of the NOR gate 80 is inputted to the delay buffer 82, the AND gate 88 and the SET terminal of the SRFF 81. The output of the delay buffer 82 is inputted to the delay buffer 83 and the AND gate 87, the output of the delay buffer 83 is inputted to the delay buffer 84 and AND gate 86, and the output of the delay buffer 84 is inputted to the AND gate 85. The output of the AND gate 85 is inputted to the SET terminal of the SRFF 89, the output of the AND gate 86 is inputted to the SET terminal of the SRFF 90, the output of the AND gate 87 is inputted to the SET terminal of the SRFF 91, and the output of the AND gate 88 is inputted to the SET terminal of the SRFF 92. All bits of the output of the ALU 22 are inputted to the NOR gate 93, and the output of the NOR gate 93 is inputted to the delay buffer 95, the AND gate 101 and the SET terminal of the SRFF 94. The output of the delay buffer 95 is inputted to the delay buffer 96 and the AND gate 100, the output of the delay buffer 96 is inputted to the delay buffer 97 and AND gate 99, and the output of the delay buffer 97 is inputted to the AND gate 98. The output of the AND gate 98 is inputted to the SET terminal of the SRFF 102, the output of the AND gate 99 is inputted to the SET terminal of the SRFF 103, the output of the AND gate 100 is inputted to the SET terminal of the SRFF 104, and the output of the AND gate 101 is inputted to the SET terminal of the SRFF 105. The outputs of the FSFF 76, 77, 78, 79, 89, 90, 91, 92, 102, 103, 104, 105 are decoded and the PALUSEL (3:1) are generated.

Figure 8:
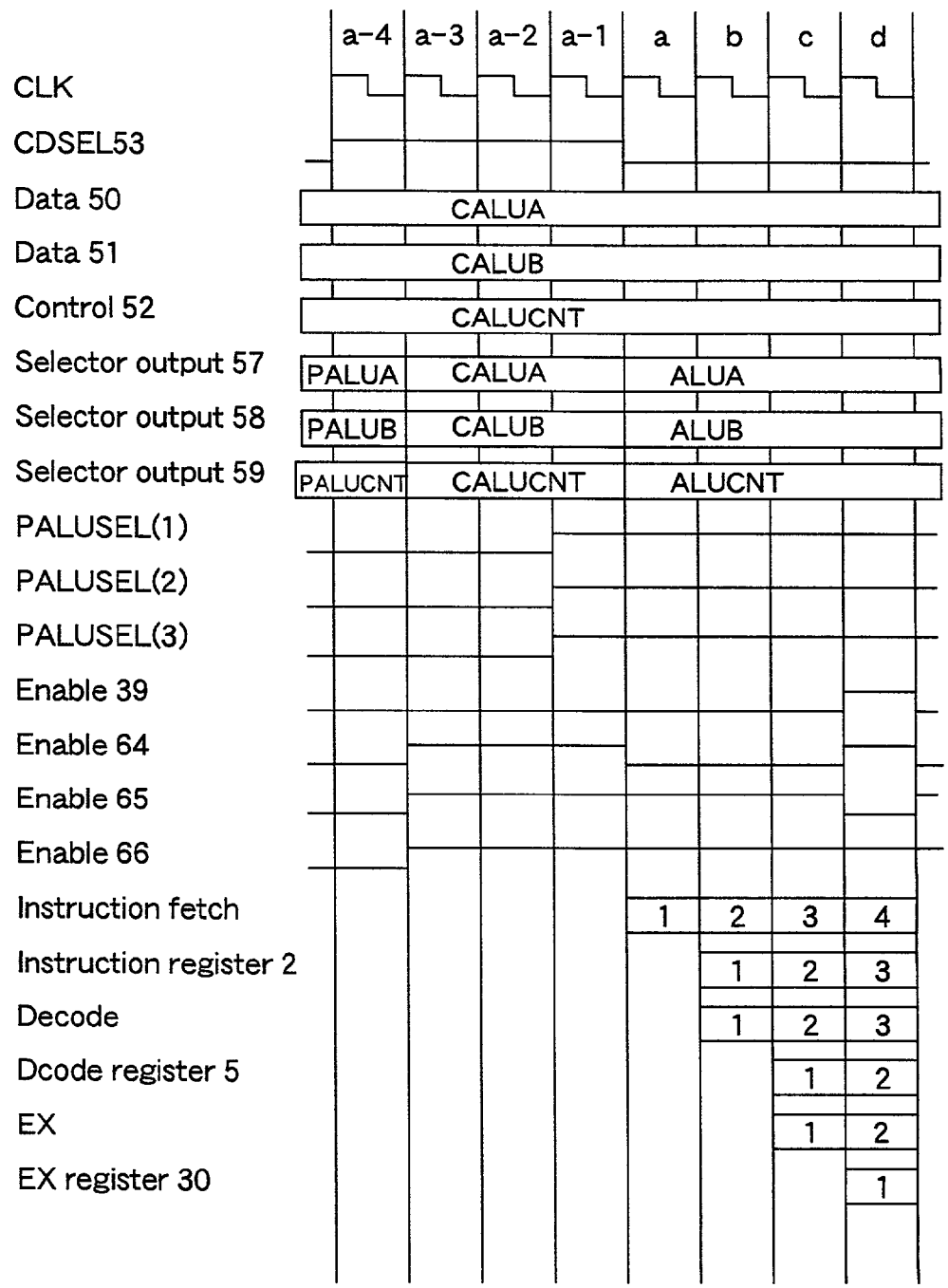
FIG. 8 is a timing chart showing a processing flow of the computer system according to Embodiment 3 of the present invention.
Figure 9:
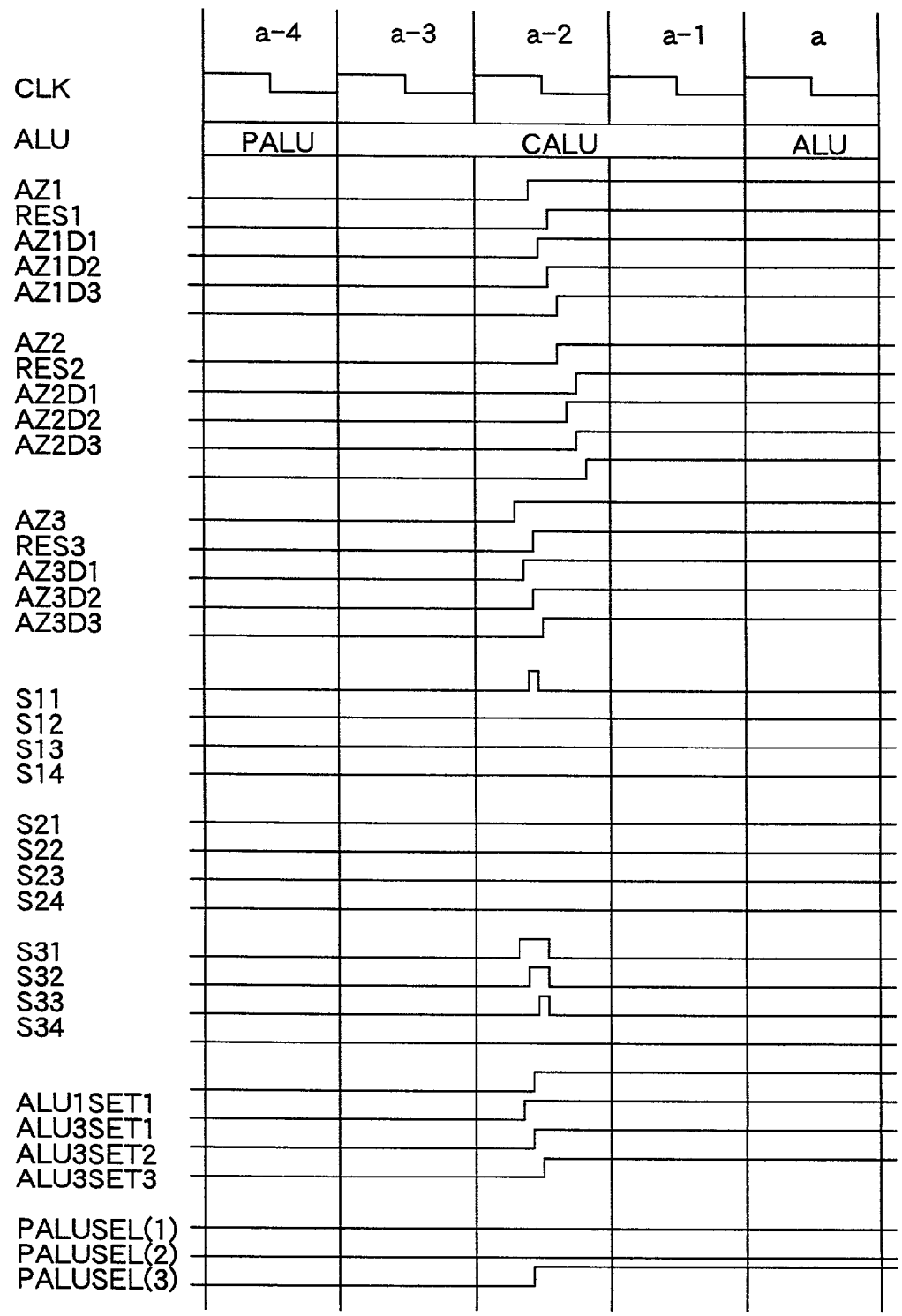
FIG. 9 is a detail a timing chart showing a detail of FIG. 8.
Figure 10:
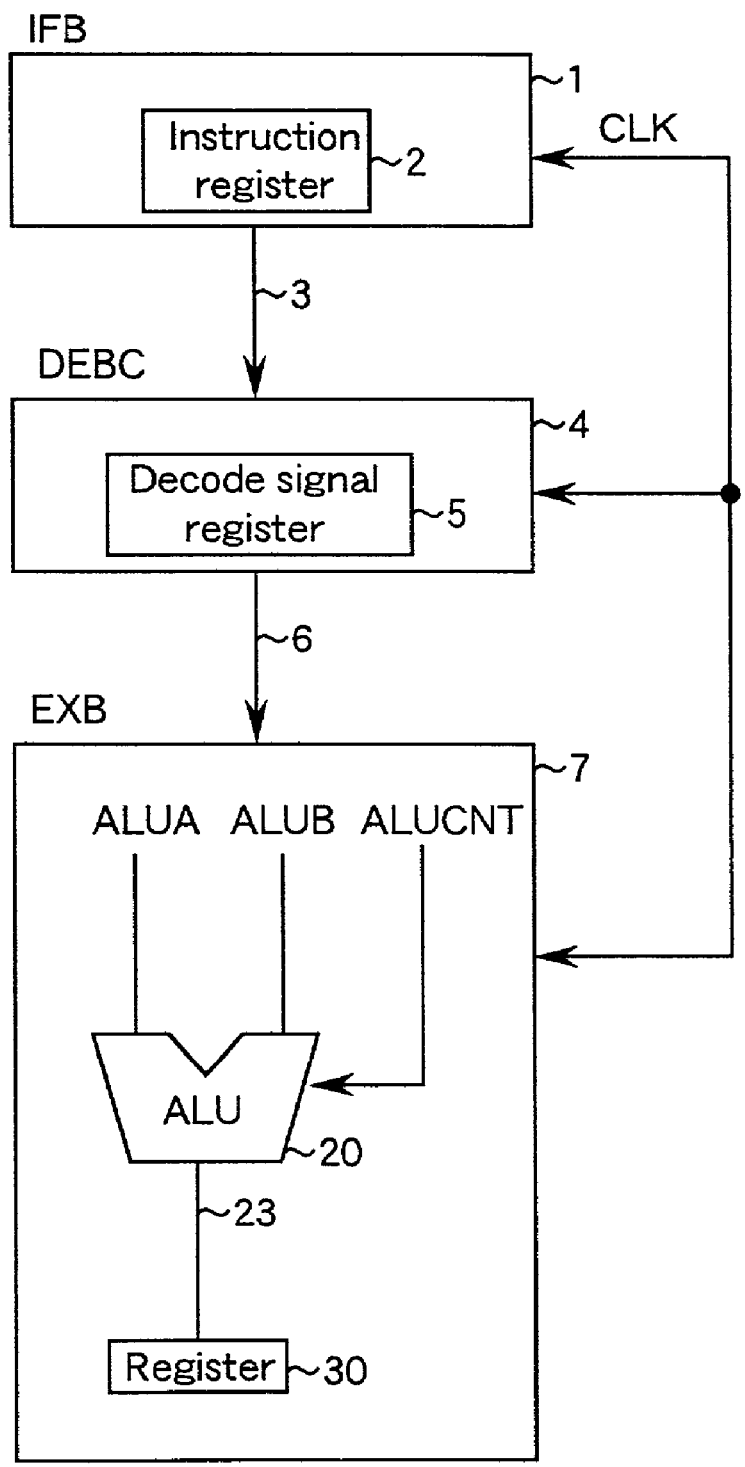
FIG. 10 is a schematic block diagram showing a conventional computer system.
Figure 11:
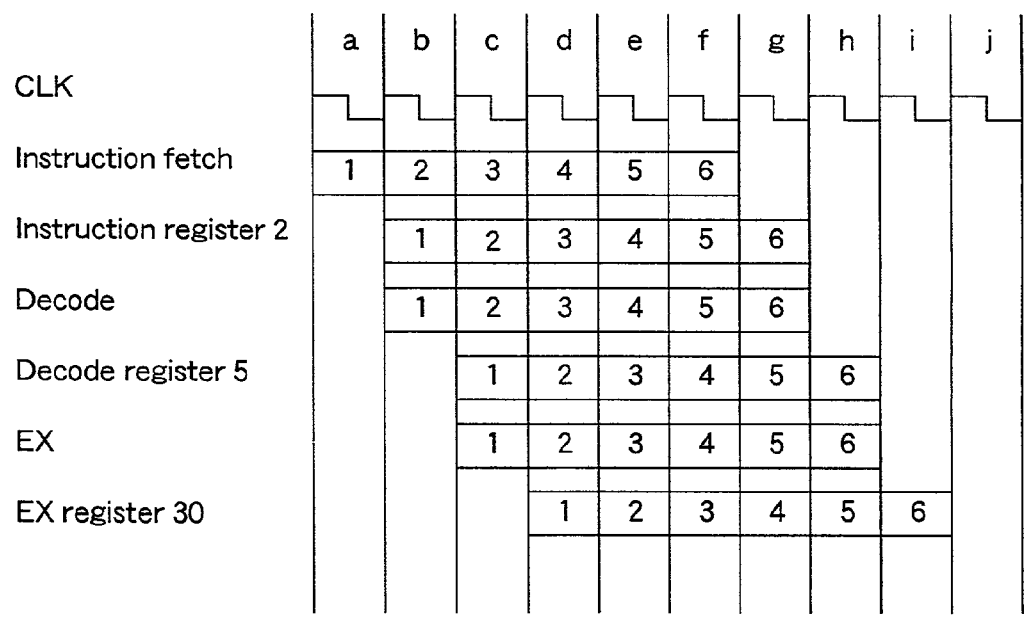
FIG. 11 is a timing chart showing a processing flow of the conventional computer system.

The operation of the computer system of this Embodiment 3 configured as shown above is described by using the timing chart of FIG. 8 and FIG. 9.

In the FIG. 8, when "a-4" period starts, the CDSEL 53 becomes effective for 4 cycles. When the CDSEL 53 is high, the output 50, 51 and 52 from the critical data generator 49 are selected by the selectors 54, 55 and 56 respectively.

When "a-3" period starts, the enable signals 64, 65 and 66 of each input data of the ALU 20, 21 and 22 become effective for 3 cycles.

During the 2 cycles "a-3" period and "a-2" period, the execution time of each ALU is measured, and then the pipeline ALU select signal PALUSEL (3:1) becomes effective from "a-1" period.

The operation of the execution time measurement unit 63 is described by using the timing chart of FIG. 9. The operation of the ALLF+0 is specified by the critical data generator 49 at "a-4" period. During 3 cycles between "a-3" to "a-1", the critical operation of the ALLF+1 is specified. The output AZ1 of the gate 67 becomes high when the ALU 20 outputs the expectation value ALL0, the output AZ2 of the gate 80 becomes high when the ALU 21 outputs the ALL0, and the output AZ3 of the gate 93 becomes high when the ALU 22 outputs the ALL0. Then, the AZ1 becomes AZ1D1 AZ1D2 and AZ1D3 via the delay buffer 69, 70 and 71. In the same way, the AZ2 becomes AZ2D1, AZ2D2 and AZ2D3 via the delay buffer 82, 83 and 84, and the AZ3 becomes AZ3D1, AZ3D2 and AZ3D3 via the delay buffer 95, 96 and 97. The NQ output RES1 of the RSFF 68 masks signals generated by the AZ2 and the AZ3. In the same way, the NQ output RES2 of the RSFF 81 masks signals generated by the AZ1 and the AZ3, and the NQ output RES3 of the RSFF 94 masks signals generated by the AZ1 and the AZ2. The ALLF+1 is executed for "a-3" and "a-2" period. According to the ALU processing ability, AZ1, AZ2, AZ3, RES1, RES2 and RES3 are generated. According to the generated order of each signal and each delay signal of the AZ1, AZ2 and AZ3 and each mask signal of the RES1, RES2 and RES3, the signal line selected from ALULSET 1-4, ALU2SET 1-4 and ALU3SET1-4 turns high, in which the SET signal turns faster than the mask signal. In this Embodiment 3, ALU22 is the fastest high frequency so AZ3 turns to high earliest, and according to AZ3, the signal ALU3SET1, ALU3SET2 and ALU3SET3 turn high. Next, AZ1 turns high, and according to AZ1, the signal ALU1SET3 turns high. As shown in the above processing, PALUSEL(1)=0, PALUSEL(2)=0, and PALUSEL(3)=1 are outputted.

In this Embodiment 3, according to PALUSEL(1)=0, PALUSEL(2)=0, PALUSEL(3)=1, normally the selector 28 selects the output 25 of the ALU 22, and only when the mismatching signal 34 is high, the selector 28 selects the output 27 of the selector 26. The enable signal 64 outputs the output 39 of the FF 37, and the enable signal 65 outputs the reverse signal of the output 39 of the FF 37, the enable signal 66 always outputs high. The operation after "a" is the same as that of Embodiment 1.

According to the result of the test data execution time measurement for each ALU, the fastest ALU is determined.
(1) When ALU20 is the fastest ALU
PALUSEL(1) becomes 1, PALUSEL(2) becomes 0, and PALUSEL(3) becomes 0. Normally the selector 28 selects the output 23 of the ALU20, and only when the mismatching signal 34 is high, the selector 28 selects the output 27 of the selector 26. The enable signal 64 always outputs high, the enable signal 65 outputs the reverse signal of the output 39 of the FF 37, and the enable signal 66 outputs the output 39 of the FF 37.
(2) When ALU21 is the fastest ALU
PALUSEL(1) becomes 0, PALUSEL(2) becomes 1, and PALUSEL(3) becomes 0. Normally the selector 28 selects the output 24 of the ALU21, and only when the mismatching signal 34 is HI, the selector 28 selects the output 27 of the selector 26. The enable signal 64 outputs the reverse signal of the output 39 of the FF 37, the enable signal 65 always outputs high, and the enable signal 66 outputs the output 39 of the FF 37.

In the above description, the critical path execution time of each ALU may be measured as the critical path execution time in each ALU. Also the critical path execution time may be measured as the sum of the execution time in each ALU and the time from the moment when the executed result is outputted till the moment when the outputted executed result is stored into the register 31 which stores the output result. It is possible to assume that the wiring delay to the output register in addition to the delay in the ALU cannot be disregarded by the high frequency driving of ALU. In this case, the evaluation of the critical path execution time is defined as adding both of the delay in the ALU and the wiring delay to the output register. Among plural ALUs prepared in the computer system, the fastest ALU that can execute a critical path test data is detected and used as the high frequency ALU, so the throughput of the computer system can be maximized.

As shown above, in the computer system of the present invention, by employing a high frequency ALU and low frequency ALUs, the entire processing speed can be increased by the high speed operation by the high frequency ALU, and when the data belonging to the critical path cannot be executed in a basic cycle by the high frequency ALU, the data are executed surely by the low frequency ALU instead, and the correct pipeline operation is secured as a whole. Plural low frequency ALUs may be provided, with each low frequency in charge of an execution stage of pipeline which also is operated in a high frequency. When the processing instruction is a critical path, the low frequency ALU in charge executes the critical path instruction in a sufficiently low frequency. Therefore, a correct execution result can be obtained. The executed result processed in a high frequency by the high frequency ALU can be confirmed as to whether it is correct. The computer system normally outputs the output of the high frequency ALU as it is as the execution result of the pipeline execution stage, and confirms whether it is correct by comparing it with the output of the low frequency ALU. If the correct execution result is not obtained by the high frequency ALU, an error processing for replacing the output of the high frequency ALU with the output of the low frequency ALU is conducted, so the correct pipeline operation is secured as a whole.

The computer system can detect the incidence of the critical path in a data to be actually processed, and vary the pipeline clock frequency according to the critical path incidence.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A computer system employing a pipeline operation wherein the pipeline is driven by a high clock frequency higher than a low clock frequency by which a critical path instruction in processing data can be executed correctly, comprising:
   a high frequency ALU driven by the high clock frequency,
   a low frequency ALU driven by the low clock frequency, by which, during the low clock frequency, the critical path instruction can be executed correctly, wherein an execution stage instruction is inputted to both the high frequency ALU and the low frequency ALU, if the high frequency ALU can execute the execution stage instruction correctly, an execution result of the high frequency ALU is output as an execution result of a pipeline execution stage, and if the high frequency ALU can not execute the execution stage instruction correctly, an execution result of the low frequency ALU is output as the execution result of the pipeline execution stage instead of the execution result of the high frequency ALU.

2. The computer system according to claim 1, wherein the low frequency ALU is composed of a plurality of low frequency ALUs;

a low frequency ALU in the plurality of low frequency ALUs in charge of each execution stage is switched in turn, and each of the plurality of low frequency ALUs in charge executes the execution stage instruction correctly by the low clock frequency which is equal to or lower than a clock frequency for operating the critical path instruction correctly.

3. The computer system according to claim 2, wherein the plurality of low frequency ALUs is equal to "n" low frequency ALUs when the high clock frequency is "n" times of the low clock frequency by which the critical path instruction can be executed correctly, each of the low plurality of frequency ALUs is in charge of "n" pieces of the pipeline execution stage in order respectively.

4. The computer system according to claim 3, further comprising a comparator comparing the result of the high frequency ALU and the result of the low frequency ALU in charge of a same execution stage for the same instruction, wherein, the result of the high frequency ALU is assumed as the execution result of the pipeline execution stage, and when a comparison result of the comparator indicates matching, the result of the high frequency ALU is determined as the execution result of the execution stage and pipeline operation is continued, and when the comparison result of the comparator indicates mismatching, the result of the high frequency ALU is replaced with the result of the low frequency ALU as the execution result of the pipeline execution stage.

5. The computer system according to claim 4, wherein when the comparison result of the comparator indicates mismatching, all stages of the pipeline are stopped until finishing a replacement process in which the result of the low frequency ALU is selected as the execution result of the pipeline execution stage.

6. The computer system according to claim 2, further comprising a comparator comparing the result of the high frequency ALU and the result of the low frequency ALU in charge of a same execution stage for a same instruction, wherein, the result of the high frequency ALU is assumed as the execution result of the pipeline execution stage, and when a comparison result of the comparator indicates matching, the result of the high frequency ALU is determined as the execution result of the execution stage and pipeline operation is continued, and when the comparison result of the comparator indicates mismatching, the result of the high frequency ALU is replaced with the result of the low frequency ALU as the execution result of the pipeline execution stage.

7. The computer system according to claim 6, wherein when the comparison result of the comparator indicates mismatching, all stages of the pipeline are stopped until finishing a replacement process in which the result of the low frequency ALU is selected as the execution result of the pipeline execution stage.

8. The computer system according to claim 1 further comprising a comparator comparing the result of the high frequency ALU and the result of the low frequency ALU in charge of a same execution stage for same instruction, wherein, the result of the high frequency ALU is assumed as the execution result of the pipeline execution stage, and when a comparison result of the comparator indicates matching, the result of the high frequency ALU is determined as the execution result of the execution stage and pipeline operation is continued, and when the comparison result of the comparator indicates mismatching, the result of the high frequency ALU is replaced with the result of the low frequency ALU as the execution result of the pipeline execution stage.

9. The computer system according to claim 8, wherein when the comparison result of the comparator indicates mismatching, all stages of the pipeline are stopped until finishing a replacement process in which the result of the low frequency ALU is selected as the execution result of the pipeline execution stage.

10. The computer system according to claim 1, further comprising a counter counting a number of occurrences of a mismatching detection signal in a predetermined period, and a circuit varying a pipeline clock frequency according to the number of occurrences.

11. The computer system according to claim 1, wherein amounts of two processes are compared when a pipeline clock frequency is increased and a number of the critical path instructions is increased, a first amount being an improved process amount of the high frequency ALU and a second amount being a deteriorated process amount that increases if a replacement process uses the result of the low frequency ALU as the execution result of the pipeline execution stage when the high frequency ALU cannot execute the execution stage instruction correctly, wherein, when the first amount is larger than the second amount by a predetermined amount, the pipeline clock frequency is increased.

12. The computer system according to claim 1, wherein amounts of two processes are compared when a pipeline clock frequency is decreased and a number of the critical path instructions is decreased, a first amount being a deteriorated process amount of the high frequency ALU if a pipeline clock frequency is lowered, and a second amount being an improved process amount that decreases if a replacement process uses the result of the low frequency ALU as the execution result of the pipeline execution stage when the high frequency ALU cannot execute the instruction correctly, wherein, when the first amount is larger than the second amount by a predetermined amount, the pipeline clock frequency is decreased.

13. The computer system according to claim 1 further comprising plural ALUs, a data generation circuit generating test data as a critical path data, an execution time measurement circuit measuring the critical path instruction in each ALU, and a detector detecting which ALU executes the critical path instruction in a shortest time, wherein, a faster ALU detected by the detector is selected as the high frequency ALU, and a slower ALU or plurality of slower ALUs is/are selected as the low frequency ALU/ALUs.

14. A method for controlling a pipeline operation in a computer system wherein a pipeline is driven by a high clock frequency higher than a low clock frequency by which a critical path instruction can be executed correctly, comprising:

using a high frequency ALU driven by a high clock frequency, a low frequency ALU driven by a low clock frequency, by which the low clock frequency executes the critical path instruction correctly, wherein an execution stage instruction is inputted to both the high frequency ALU and the low frequency ALU, if the high frequency ALU can execute the execution stage instruction correctly, an execution result of the high frequency ALU is output as an execution result of a pipeline execution stage, if the high frequency ALU can not execute the execution stage instruction correctly, the execution result of the low frequency ALU is output as the execution result of the pipeline execution stage instead of the execution result of the high frequency ALU.

15. The method for controlling a pipeline operation in a computer system according to claim 14, wherein the low frequency ALU is composed of a plurality of low frequency ALUs;

switching one of the plurality of low frequency ALUs in charge of each execution stage in turn, and assigning each of the plurality of low frequency ALUs in charge for an execution stage instruction to execute the execution stage instruction correctly during the low clock frequency which is equal to or lower than a clock frequency for operating the critical path instruction correctly.

16. The method for controlling a pipeline operation in a computer system according to claim 15, wherein the plurality of low frequency ALUs is equal to "n" low frequency ALUs when the high clock frequency is "n" times of the low clock frequency by which the critical path instruction can be executed correctly, each of the plurality of low frequency ALUs is in charge of "n" pieces of the pipeline execution stage in order respectively.

17. The method for controlling a pipeline operation in a computer system according to claim 16, further comprising comparing the result of the high frequency ALU and the result of the low frequency ALU in charge of a same execution stage for a same instruction, wherein, the result of the high frequency ALU is assumed as the execution result of the pipeline execution stage, and when a comparison result indicates matching, the result of the high frequency ALU is determined as the execution result of the execution stage and pipeline operation is continued, and when the comparison result indicates mismatching, the result of the high frequency ALU is replaced with the result of the low frequency ALU as the execution result of the pipeline execution stage.

18. The method for controlling a pipeline operation in a computer system according to claim 17, wherein when the comparison result indicates mismatching, all stages of the pipeline are stopped until finishing a replacement process in which the result of the low frequency ALU is selected as the execution result of the pipeline execution stage.

19. The method for controlling a pipeline operation in a computer system according to claim 15, further comprising comparing the result of the high frequency ALU and the result of the low frequency ALU in charge of a same execution stage for a same instruction, wherein, the result of the high frequency ALU is assumed as the execution result of the pipeline execution stage, and when a comparison result indicates matching, the result of the high frequency ALU is determined as the execution result of the execution stage and pipeline operation is continued, and when the comparison result indicates mismatching, the result of the high frequency ALU is replaced with the result of the low frequency ALU as the execution result of the pipeline execution stage.

20. The method for controlling a pipeline operation in a computer system according to claim 19, wherein when the comparison result indicates mismatching, all stages of the pipeline are stopped until finishing a replacement process in which the result of the low frequency ALU is selected as the execution result of the pipeline execution stage.

21. The method for controlling a pipeline operation in a computer system according to claim 14 further comprising for comparing the result of the high frequency ALU and the result of the low frequency ALU in charge of a same execution stage for a same instruction, wherein, the result of the high frequency ALU is assumed as the execution result of the pipeline execution stage, and when a comparison result indicates matching, the result of the high frequency ALU is determined as the execution result of the execution stage and pipeline operation is continued, and when the comparison result indicates mismatching, the result of the high frequency ALU is replaced with the result of the low frequency ALU as the execution result of the pipeline execution stage.

22. The method for controlling a pipeline operation in a computer system according to claim 21, wherein when the comparison result indicates mismatching, all stages of the pipeline are stopped until finishing a replacement process in which the result of the low frequency ALU is selected as the execution result of the pipeline execution stage.

23. The method for controlling a pipeline operation in a computer system according to claim 14, further comprising counting a number of occurrences of a mismatching detection signal in a predetermined period, and varying a pipeline clock frequency according to the number of occurrences.

24. The method for controlling a pipeline operation in a computer system according to claim 14, wherein amounts of two processes are compared when a pipeline clock frequency is increased and a number of the critical path instructions is increased, a first amount being an improved process amount of the high frequency ALU and a second amount being a deteriorated process amount that increases if a replacement process uses the result of the low frequency ALU as the execution result of the pipeline execution stage when the high frequency ALU cannot execute the instruction correctly, wherein, when the first amount is larger than the second amount by a predetermined amount, the pipeline clock frequency is increased.

25. The method for controlling a pipeline operation in a computer system according to claim 14 wherein, amounts of two processes are compared when a pipeline clock frequency is decreased and a number of the critical path instructions is decreased, a first amount being a deteriorated process amount of the high frequency ALU if the pipeline clock frequency is lowered, and a second amount being an improved process amount that decreases if a replacement process uses the result of the low frequency ALU as the execution result of the pipeline execution stage when the high frequency ALU cannot execute the instruction correctly, wherein, when the first amount is larger than the second amount by a predetermined amount, the pipeline clock frequency is decreased.

26. The method for controlling a pipeline operation in a computer system according to claim 14, using plural ALUs, further comprising generating test data as a critical path data, measuring the critical path instruction in each ALU, and detecting which ALU that executes the critical path instruction in a shortest time, wherein, a faster detected ALU is selected as the high frequency ALU, and a slower ALU or plurality of slower ALUs is/are selected as the low frequency ALU/ALUs.

* * * * *